United States Patent [19]

Wiig

[11] 4,145,016
[45] Mar. 20, 1979

[54] TENSIONING APPARATUS

[75] Inventor: Selmer L. Wiig, Walnut, Calif.

[73] Assignee: Lockheed Electronics Company, Inc., Plainfield, N.J.

[21] Appl. No.: 780,319

[22] Filed: Mar. 23, 1977

[51] Int. Cl.² .......................... G03B 1/04; G11B 15/32
[52] U.S. Cl. ..................................... 242/193; 352/156
[58] Field of Search .......................... 242/75, 193–198, 242/200–204, 210; 352/156; 64/15 R–15 C

[56] References Cited

U.S. PATENT DOCUMENTS

| | | | |
|---|---|---|---|
| 2,996,264 | 8/1961 | Bygdnes | 242/193 |
| 3,252,669 | 5/1966 | Geri | 242/194 |
| 3,679,215 | 7/1972 | Roberts | 242/193 X |
| 3,716,205 | 2/1973 | Geuder | 242/194 |

FOREIGN PATENT DOCUMENTS 963782  7/1964  United Kingdom ..................... 242/198

*Primary Examiner*—Leonard D. Christian
*Attorney, Agent, or Firm*—Billy G. Corber

[57] ABSTRACT

A mechanism by which more than one torsion spring can be serially coupled to a member to impart a torque thereto equivalent to that from a single spring having the same number of turns as the total turns of the coupled springs. The springs to be coupled are connected at one end to respective storage shafts which are mounted to a free floating coupling arm. The coupling arm rotates about a shaft coaxial with the member to which the other ends of the springs are attached. In a capstan driven web system having a take-up reel and a supply reel, two sets of serially coupled negator springs are utilized to maintain proper web tension during driving of the web system.

11 Claims, 1 Drawing Figure

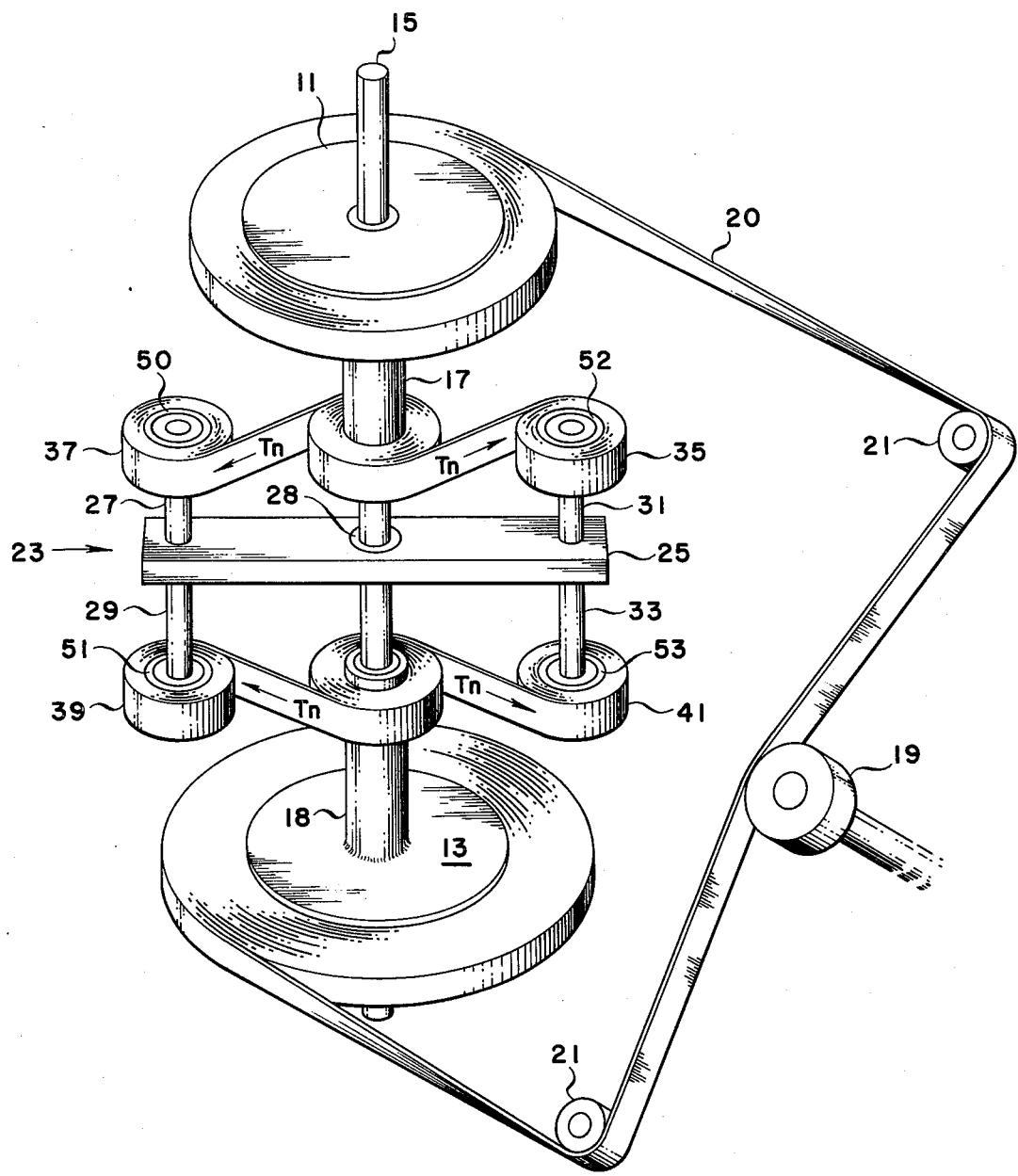

TENSIONING APPARATUS

BACKGROUND OF THE INVENTION

The subject invention relates to the coupling together of two or more springs in series and more particularly to the coupling of such springs in connection with the take-up and supply reels of a web system.

In the prior art, negator springs have been used to supply the differential motion between supply and take-up reels of a capstan driven web system. Since the number of turns such springs provide is limited, it has been necessary to couple such springs together in order to increase the number of spring turns available to provide sufficient tension for long tape lengths. In the prior art, such springs have been coupled together by means of gearing, belts or chains. However, these prior art techniques prove disadvantageous because the added complexity of gears, belts or chains results in decreased reliability and increased cost and weight of the web system. Since such web systems are typically used in space applications, reliability, cost and weight are highly important factors.

OBJECTS AND SUMMARY OF THE INVENTION

An object of this invention is to provide a means for serially coupling springs without the use of gears, belts or chains.

Another object of this invention is to provide a means for creating web tension in a capstan driven reel system wherein negator springs are serially coupled together without the use of gears, belts or chains.

Another object of this invention is to provide improved means for creating web tension in a capstan driven reel system which is capable of smoothing surge changes in tape tension to avoid "looping" when subjected to rapid changes in tape speed.

It is another object of the invention to provide a simplified method for increasing the tape storing capacity of a capstan driven reel system.

These objects and the general purpose of this invention are accomplished as follows. Each of at least one pair of torsional springs is attached at one end to an orbital spring storage drum. The other end of each spring in a pair is attached to wind on a different one of two reel hubs. When relative rotation in one direction occurs between the different reel hubs, the springs wind up on the reel hubs. Rotation in the opposite direction causes the springs to wind up on the storage drums. By thusly coupling two springs in series, the available turns for winding the web on the reels is doubled. By adding additional springs, web tension is increased.

BRIEF DESCRIPTION OF THE DRAWING

The single FIGURE of the drawing is an isometric view of a web transport apparatus illustrating the spring coupling of this invention.

DETAILED DESCRIPTION OF THE PREFERRED EMBODIMENT

A web system incorporating the preferred embodiment of the invention is illustrated in the drawing. The web apparatus includes a supply reel 11 and a take-up reel 13. Each reel 11, 13 has a hub 17, 18 and rotates freely on a central shaft 15. The reel hubs 17, 18 are disposed inwardly, facing each other. A capstan 19 draws tape 20 off a supply reel 11 around a guide roller 21. In order to maintain tension on the tape 20 and drive the supply reel 11, a spring coupling apparatus 23 embodying the preferred embodiment of the invention is located between the hubs 17, 18 of the supply and take-up reels 11, 13.

This coupling apparatus 23 employs a coupling arm 25 rotatably carried intermediate its ends on central shaft 15 through bearing 28. This bearing 28 permits the coupling arm 25 to rotate freely with respect to the central shaft 15. One end of the coupling arm 25 mounts a pair of spring storage shafts 27, 29 while the other end of the coupling arm 25 mounts a second pair of spring storage shafts 31, 33.

Each of the four storage shafts 27, 29, 31, 33 carries a drum 50, 51, 52, 53 on which one end of a negator spring 35, 37, 39, 41 is attached thereto. Drums 50, 51, 52 and 53 are free to rotate on its shaft. Thus, negator springs 35, 37 are mounted about the hub 17 of supply reel 11, and negator 41, 39 are mounted about the hub 18 of the take-up reel 13. Negator springs 35, 41 make up one spring pair and negator springs 37, 39 make up the other spring pair in spring coupling apparatus 23 representing the preferred embodiment. The free ends of negator springs 35, 37 are attached to the hub of the supply reel 11 such that relative motion of the hub 17 with respect to the storage shafts 27, 31 in an unwind (supply) direction causes the springs 35, 37 to wind onto the hub 17. Negator springs 41, 39 are similarly attached to the hub 18 of the take-up reel 13 such that motion of the take-up reel 13 in a take-up direction relative to the spring storage shafts 29, 33 causes the springs 39, 41 to wind onto hub 18. As well known in the art, negator springs are springs designed to apply a constant spring force or tension as they wind or unwind.

As thus connected, the coupling apparatus 23 operates to provide the requisite differential motion of the tape reels as tape is wound from one reel to another and effectively doubles the available turns for winding the tape web on the reels. The use of two pairs of springs 35, 41 and 37, 39 effectively doubles the torque applied to the reel hubs 17, 18. Initially the take-up reel 13 must rotate at a higher velocity than the supply reel 11. This differential motion is provided while maintaining essentially constant tape tension as springs 39, 41 unwind from the take-up reel hub 18 while springs 35, 37 unwind from the supply reel hub 17. As the tape diameter on each reel nears equality, the unwinding of the springs 35, 37, 39, 41 slows. At the center of the tape, there is no winding of any of the springs 35, 37, 39, 41. Past the center of the tape, the supply reel 11 begins to rotate faster than the take-up reel. When this occurs, springs 35, 37, 39, 41 rewind onto reel hubs 17, 18. When the tape direction is reversed, the same process occurs in the reverse direction as the springs unwind from their respective storage drums 50, 51, 52, 53.

By mounting spring storage drums 50, 51, 52, 53 on arm 25 through shafts 27, 29, 31, 33 and allowing the arm to rotate freely about central shaft 15, springs 35, 41 and 37, 39 constitute two pairs of series coupled springs wherein the two springs in a pair share the differential motion of the reels to double the available spring turns for winding the web on the reels, thus increasing the tape storage capacity of the web system. By using two pairs of springs rather than only one pair, web tension is doubled.

An additional benefit flowing from the series coupling of the negator springs through arm 25 is that the web system will, due to inertia effects, maintain a more constant tape tension in the presence of tape speed variations than will a conventional system where the spring or springs are directly coupled between reels.

As may be apparent, numerous modifications are possible in the just described preferred embodiment without departing from the scope and spirit of the invention. For example, two or more springs may be employed in combinations other than the two series pairs shown, and the spacing between the assembly of parts along central shaft 15, as well as the physical dimensions and relative proportions of the parts themselves, may be changed to meet particular design requirements. Therefore, it is to be understood that, within the scope of the appended claims, the invention may be practiced otherwise than as specifically described above.

What is claimed is:

1. In a capstan driven web system having a take-up reel and a supply reel coaxially mounted for rotation about a support shaft, apparatus for providing tension on the web between the two coaxial reels, said apparatus comprising:
   a coupling arm mounted for rotation about said support shaft between said take-up and supply reels;
   an even number of spring storage shafts mounted on said coupling arm; and
   a plurality of torsional springs equal in number to said storage shafts, each said spring mounted to a respective said storage shaft by a first end, the second ends of a first half of said springs being connected to said supply reel, the second ends of a second half of said springs being connected to said take-up reel.

2. The apparatus of claim 1 further including a drum mounted on each said storage shaft, said springs having their first ends connected to their respective drum for storage thereon.

3. The apparatus of claim 1 wherein each said torsional springs is a negator spring.

4. In a capstan driven web system having a take-up reel and supply reel, each coaxially mounted for rotation, apparatus for providing tension in the web between the two reels, said apparatus comprising:
   a coupling arm;
   a plurality of spring storage means mounted on said coupling arm; and
   a plurality of torsional springs, one for each of said storage means, mounted to their respective storage means at a first end, the torsional springs being separated into two groups of relatively equal torque, one group having its second ends attached to said take-up reel and the other group having its second ends attached to said supply reel.

5. The apparatus of claim 4 wherein each said storage means comprises:
   a shaft; and
   a drum attached to said shaft.

6. The apparatus of claim 4 wherein each said spring is a negator spring.

7. Apparatus for applying tension between two movable members comprising:
   a coupling arm rotatably mounted between said members;
   at least one pair of spring storage drums rotatably carried on said coupling arm; and
   a torsional spring for each of said storage drums connecting one of said storage drums to one of said two members and the other of said storage drums to the other of said two members.

8. The apparatus of claim 7 including a common support shaft wherein said members and said arm are mounted on said shaft for rotation about said shaft.

9. The apparatus of claim 8 including drum shaft means spaced from said support shaft and connecting said storage drums to said coupling arm for orbital motion about said support shaft.

10. The apparatus of claim 9 wherein each said spring is a negator spring.

11. The apparatus of claim 9 wherein said movable members are web transport reels.

* * * * *